United States Patent Office 3,729,441
Patented Apr. 24, 1973

3,729,441
STABILIZED HIGH MOLECULAR WEIGHT
POLY(ETHYLENE OXIDE)
Hideo Tomomatsu, Austin, Tex., assignor to Jefferson
Chemical Company, Inc., Houston, Tex.
No Drawing. Filed Nov. 4, 1971, Ser. No. 195,809
Int. Cl. C08f 45/58, 51/58
U.S. Cl. 260—45.95 R          3 Claims

ABSTRACT OF THE DISCLOSURE

High molecular weight polymers of poly(ethylene oxide) are stabilized so as to inhibit degradation thereof to lower molecular weight polymer by admixing therewith 2,6-di-tert-butyl-4-methoxy phenol.

---

This invention relates to a novel process for stabilizing high molecular weight polymers of poly(ethylene oxide) and to such a stabilized composition of matter.

It is well recognized that the storage and handling of high molecular weight polymers of poly(ethylene oxide) have proven difficult. High molecular weight poly(ethylene oxide) tends to degrade to lower molecular weight polymer. The degradation occurs both when the polymer is in a solid state or when it is in an aqueous solution. The degradation to lower molecular weight polymers is generally accelerated in the latter situation.

Consequently, unless the poly(ethylene oxide) polymer is stabilized, degradation to a lower molecular weight polymer results. Such a result may seriously and adversely affect the intended use of the polymer, such as where the intended rheological properties of the polymer are detrimentally altered. Accordingly, stabilizers have heretofore been proffered for use with poly(ethylene oxide) polymers. Sundry examples include propyl gallate, triorganophosphite, thiogluconic acid, thuriam tetrasulfide, and the like.

It is recognized that phenolic compounds have heretofore been employed as polyester stabilizers, but it was with great surprise that I unexpectedly found that when 2,6-di-tert-butyl-4-methoxy phenol was admixed with high molecular weight poly(ethylene oxide) it was, unlike the analogous hindered phenol compounds, tremendously effective for inhibiting the degradation of high molecular weight poly(ethylene oxide). Admittedly, I have no explanation as to why this particular compound is tremendously effective when almost identical compounds are, comparatively, virtually useless.

In accordance with my invention, a water soluble high molecular weight poly(ethylene oxide) polymer is stabilized against molecular weight degradation by the addition thereto of an effective amount of 2,6-di-tert-butyl-4-methoxy phenol. As used herein, the term "high molecular weight poly(ethylene oxide) polymer" refers to poly(ethylene oxide) having a molecular weight of at least about 10,000. The upper molecular weight range is limited basically only by the intended use. Polymers having a molecular weight such as 10,000,000, and even higher, can be employed.

An effective amount of stabilizer will prevent molecular weight degradation of the poly(ethylene oxide) for a period of time sufficient to enable its application for its intended purpose without detrimental effects. Larger amounts of stabilizer will provide added protection against molecular weight degradation over longer periods of time.

Generally, at least about .005, and in the range of about .005 to 3 wt. percent of stabilizer based on the weight of the poly(ethylene oxide) polymer will be sufficiently effective. Larger or smaller amounts can, of course, be employed. Preferably, .01 to 1 wt. percent stabilizer can be employed.

The 2,6-di-tert-butyl-4-methoxy phenol stabilizer of this invention can be dry blended into the poly(ethylene oxide) polymer such as by incorporating it into the polymer by conventional blending in any fashion that provides the primary desired result which is an intimate mixture of the polymer and stabilizer. The stabilizer can, if desired, be added to the monomeric material to be polymerized or incorporated into the reaction mixture in which the polymer was formed, and then later can be incorporated with the polymer at a temperature above the melting point of the polymer to further insure admixture therewith. It can also be incorporated with the poly(ethylene oxide) polymer as an aqueous solution, and the like, or admixed to an aqueous solution of the poly(ethylene oxide).

The subject stabilizer is available on the commercial market and use thereof, in accordance with my disclosure, provides a heretofore unknown method for stabilizing so effectively high molecular weight poly(ethylene oxide).

Illustrative of the foregoing discussion and description, and not to be interpreted as a limitation on the scope thereof or on the materials herein employed, the following examples are presented.

EXAMPLES I-VI

The following series of examples illustrate the surprising stabilizing effects of 2,6-di-tert-butyl-4-methoxy phenol on high molecular weight poly(ethylene oxide), and the relative ineffectiveness of almost identical and other related hindered phenols.

In the following examples a poly(ethylene oxide) polymer of molecular weight 250,000 was employed. The ability of various additives to inhibit polymer degradation was determined by measuring the viscosity of a 2 wt. percent aqueous solution of a poly(ethylene oxide) polymer immediately upon preparation of said aqueous solution and again after storing the poly(ethylene oxide) solution at 50° C. for 56 days.

Except for control Example I, all the additives, as identified in Table 1, were employed in an amount to provide .027 wt. percent of additive based on the weight of the poly(ethylene oxide). The viscosity of the poly(ethylene oxide) solutions in all of the examples was 6.0 cps. initially as measured on a Brookfield viscometer. The viscosity of each solution was again measured after 56 days storage and the decrease in the viscosity determined and reported in Table 1 as a percentage of the original viscosity, i.e., percent viscosity decrease.

TABLE 1

| Example No. | Additive | (Percent) viscosity decreasement |
|---|---|---|
| I | None | 43.3 |
| II | 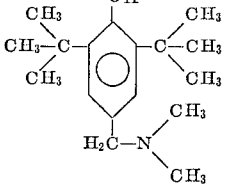 2,6-di-tert-butyl-2-dimethyl amino-p-cresol | 41.7 |
| III | 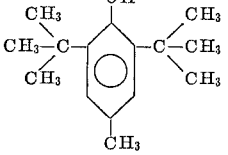 2,6-di-tert-butyl-4-methyl phenol | 41.7 |
| IV | 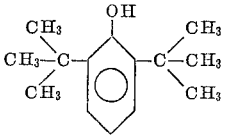 2,6-di-tert-butyl phenol | 45.0 |
| V | 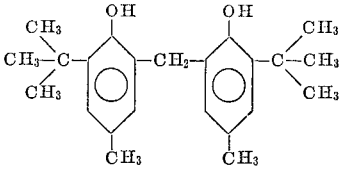 2,2'-methylene-bis-(4-methyl-6-tert-butyl phenol) | 41.7 |
| VI | 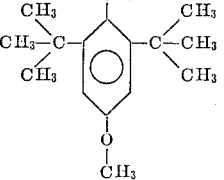 2,6-di-tert-butyl-4-methoxy phenol | 10.0 |

EXAMPLES VII and VIII

In similar fashion, 2 wt. percent aqueous solutions of poly(ethylene oxide) polymers of 50,000 and 250,000 molecular weight, respectively, were prepared. These polymer solutions started degrading immediately upon preparation thereof, as indicated by a decrease in viscosity of the solutions. At the end of 40 days storage the viscosity of the solutions decreased about 50%. Identical polymer solutions containing .053 wt. percent 2,6-di-tert-butyl-4-methoxy phenol showed no degradation and the viscosity of the poly(ethylene oxide) aqueous solution remained substantially unchanged at the end of 40 days, thus indicating the unusual effectiveness of the subject stabilizer.

As will be evident to those skilled in the art, various modifications of this invention can be made or followed in light of the discussion and disclosure herein set forth without departing from the spirit or the scope of this invention.

I claim:

1. A composition of matter comprising a high molecular weight water soluble poly(ethylene oxide) polymer and at least .005 weight percent based on the weight of said polymer of 2,6-di-tert-butyl-4-methoxy phenol.

2. The composition of matter of claim 1 containing in the range of about .005 to 3 wt. percent 2,6-di-tert-butyl-4-methoxy phenol.

3. The composition of matter of claim 2 containing in the range of about .01 to 1 wt. percent 2,6-di-tert-butyl-4-methoxy phenol and wherein the molecular weight of said polymer is about 10,000 or higher.

References Cited

UNITED STATES PATENTS

| | | | |
|---|---|---|---|
| 3,324,078 | 6/1967 | Motsui | 260—45.75 R |
| 3,429,794 | 2/1969 | Patterson | 264—22 |
| 3,196,185 | 7/1965 | Ranson | 260—45.95 R |
| 3,597,387 | 8/1971 | Starr et al. | 260—45.95 R |

DONALD E. CZAJA, Primary Examiner

W. E. PARKER, Assistant Examiner

U.S. Cl. X.R.

260—45.7 R